United States Patent
Grangeon et al.

(10) Patent No.: US 6,780,466 B2
(45) Date of Patent: Aug. 24, 2004

(54) CROSS-FLOW FILTER MEMBRANE AND METHOD OF MANUFACTURING IT

(75) Inventors: André Grangeon, Valreas (FR); Philippe Lescoche, Faucon (FR); Thomas Fleischmann, Quirla (DE); Bernd Ruschel, Gangloff (DE)

(73) Assignee: Technologies Avancees & Membranes Industrielles, Nyons (FR)

( * ) Notice: Subject to any disclaimer, the term of this patent is extended or adjusted under 35 U.S.C. 154(b) by 0 days.

(21) Appl. No.: 10/295,841

(22) Filed: Nov. 18, 2002

(65) Prior Publication Data

US 2003/0070981 A1 Apr. 17, 2003

Related U.S. Application Data

(62) Division of application No. 09/627,068, filed on Jul. 27, 2000, now Pat. No. 6,499,606.

(30) Foreign Application Priority Data

Aug. 4, 1999 (FR) .......................................... 99 10294

(51) Int. Cl.⁷ ................................................ B01D 5/00
(52) U.S. Cl. ...................... 427/256; 427/261; 210/490; 210/500.25; 210/510.1; 55/523; 55/524
(58) Field of Search .................................. 427/261, 256; 210/490, 500.25, 510.1; 55/523, 524; 428/358

(56) References Cited

U.S. PATENT DOCUMENTS

| | | | |
|---|---|---|---|
| 4,276,071 A | * | 6/1981 | Outland ........................ 55/523 |
| 4,390,355 A | * | 6/1983 | Hammond et al. ............ 55/523 |
| 5,607,586 A | * | 3/1997 | Grangeon et al. ...... 210/321.78 |
| 5,853,582 A | * | 12/1998 | Grangeon et al. ...... 210/321.89 |
| 6,375,014 B1 | * | 4/2002 | Garcera et al. ............. 210/490 |
| 6,499,606 B1 | * | 12/2002 | Grangeon et al. ........... 210/490 |

* cited by examiner

*Primary Examiner*—Ana Fortuna
(74) *Attorney, Agent, or Firm*—Dennison, Schultz, Dougherty & MacDonald

(57) ABSTRACT

The invention provides a membrane for cross-flow filtering of a fluid to be treated, said membrane comprising an inorganic rigid porous support defining at least one flow channel for the fluid to be treated flowing in a given direction, the surface of the channel being covered in at least one separator layer separating out from the fluid to be treated a fraction referred to as the permeate which passes through the layer and the support. According to the invention, the separator layer presents a thickness gradient that decreases in the flow direction of the fluid to be treated.

7 Claims, 3 Drawing Sheets

FIG.4

| | Segment 4 | Segment 3 | Segment 2 | Segment 1 | Ratio Inlet flow rate / Outlet flow rate |
|---|---|---|---|---|---|
| Thickness (µm) | 50 | 50 | 49 | 48 | |
| Permeability of the layer $m^3/m^2/s/m/Pa \times 10^{-12}$ | 2,14 | 2,04 | 2,03 | 2 | |
| V (m/s) | 3 | 3 | 3 | 3 | |
| Mean pressure of segment (b) | 1,39 | 1,28 | 1,17 | 1,06 | 1,20 |
| Segment flow rate $(m^3/m^2/s \times 10^{-4})$ | 9,97 | 9,98 | 9,04 | 8,28 | |
| V (m/s) | 4 | 4 | 4 | 4 | |
| Mean pressure of segment (b) | 1,53 | 1,38 | 1,23 | 1,08 | 1,35 |
| Segment flow rate $(m^3/m^2/s \times 10^{-4})$ | 11,5 | 11,2 | 9,76 | 8,52 | |
| V (m/s) | 5 | 5 | 5 | 5 | |
| Mean pressure of segment (b) | 1,74 | 1,53 | 1,32 | 1,11 | 1,44 |
| Segment flow rate $(m^3/m^2/s \times 10^{-4})$ | 12,5 | 11,9 | 10,2 | 8,67 | |

FIG.5

| | Segment 4 | Segment 3 | Segment 2 | Segment 1 | Ratio Inlet flow rate / Outlet flow rate |
|---|---|---|---|---|---|
| Thickness (µm) | 89 | 80 | 67 | 45 | |
| Permeability of the layer $m^3/m^2/s/m/Pa \times 10^{-12}$ | 2,01 | 1,99 | 2,00 | 1,99 | |
| V (m/s) | 3 | 3 | 3 | 3 | 0,93 |
| Mean pressure of segment (b) | 1,39 | 1,28 | 1,17 | 1,06 | |
| Segment flow rate $(m^3/m^2/s \times 10^{-4})$ | 7,69 | 8,08 | 8,55 | 8,29 | |
| V (m/s) | 4 | 4 | 4 | 4 | 0,94 |
| Mean pressure of segment (b) | 1,53 | 1,38 | 1,23 | 1,08 | |
| Segment flow rate $(m^3/m^2/s \times 10^{-4})$ | 8,9 | 9,06 | 9,24 | 9,49 | |
| V (m/s) | 5 | 5 | 5 | 5 | 0,99 |
| Mean pressure of segment (b) | 1,74 | 1,53 | 1,32 | 1,11 | |
| Segment flow rate $(m^3/m^2/s \times 10^{-4})$ | 9,62 | 9,66 | 9,65 | 9,65 | |

CROSS-FLOW FILTER MEMBRANE AND METHOD OF MANUFACTURING IT

This is a division of application Ser. No. 09/627,068 filed Jul. 27, 2000 now U.S. Pat. No. 6,499,606.

FIELD OF THE INVENTION

The present invention relates to the technical field of separating out molecules or particles by implementing separator elements generally known as "membranes" and made out of inorganic materials and constituted by a rigid porous support having at least one flow channel for a fluid medium, with at least one separator layer being deposited on the surface thereof, the nature and the morphology of the layer being adapted to separate out molecules or particles contained in the fluid medium for treatment.

More precisely, the invention relates to making separator layers forming parts of inorganic membranes.

A particularly advantageous application of the invention lies in the fields of nanofiltration, ultrafiltration, microfiltration, filtration, and reverse osmosis.

BACKGROUND OF THE INVENTION

In conventional manner, a membrane is defined by associating a porous support made of inorganic material, such as a ceramic, with one or more separator layers of inorganic material deposited on the surface of each flow channel and connected to one another and to the support by sintering. The function of the layers is to separate out molecular or particulate species, while the function of the support is to provide mechanical strength enabling thin layers to be made. Thus, the support provides mechanical strength without contributing to the hydraulic resistance of the membrane, while the separator layer defines permeability without contributing to mechanical strength.

In the state of the art, numerous membranes are known made from filter elements that are tubular or plane in shape. In the field of tubular membranes, the rigid porous support is elongate in shape having a right cross-section that is polygonal or circular. The porous support is arranged to include at least one channel, and preferably a series of channels that are parallel to one another and to the longitudinal axis of the porous support, each channel being in the form of a cylinder. At one end, the channels communicate with an inlet chamber for the fluid medium to be treated, and at the other end they communicate with an outlet chamber. The surface of each channel is covered in at least one separator layer serving to separate out molecules or particles contained in the fluid medium flowing along the inside of the channels in a given direction form one end of the channels to the other. By a sieving effect, such a membrane separates out molecular or particulate species from the substance to be treated, insofar as all particles or molecules of diameter larger than the pores in the membrane are stopped. During separation, fluid transfer takes place through the separator layer, and then the fluid spreads into the pores of the support and reaches the outside surface of the porous support. The portion of the fluid for treatment that passes through the separator layer and the porous support is referred to as the "permeate" and it is recovered by a collector chamber surrounding the membrane.

In the technical field of plane membranes, the porous support is in the form of a block having at least one channel, and generally a series of superposed channels formed therein, each channel having a right cross-section that is polygonal, and generally rectangular. The surface of each channel is covered in at least one separator layer.

When cross-flow filtering is used, the fluid to be treated flows at high speed over the surfaces of the channels so as to generate shear stress which redisperses the matter deposited on said surfaces. Fluid friction thus arises on the surfaces of the channels and causes head loss which varies linearly as a function of channel length. This head loss depends on dimensional parameters such as the length of the membrane, its hydraulic diameter, and experimental parameters such as the flow speed, the viscosity, and the density of the fluid to be treated.

Since the force driving filtering is pressure, the pressure of the fluid to be treated is observed to decrease along the channels. Such a pressure gradient modifies the transverse flow of the permeate passing through the separator layer and then the porous body. The flow rate of the permeate thus varies along the membrane. This permeate flow rate gradient leads to non-uniformity in the separation performed by the membrane and leads to different separation conditions appearing along the channels.

In an attempt to remedy those drawbacks, U.S. Pat. No. 4,105,547 describes a cross-flow filter device implementing a system for compensating longitudinal head loss. Such a system consists in causing the permeate to flow tangentially outside the membrane in the same direction as the fluid to be treated flows tangentially inside the channels. The head loss in the permeate flow is identical to that of the fluid to be treated. Compensation thus occurs between the two head losses such that the transfer pressure is the same at all points along the channels.

Such a device presents the drawback of requiring a permeate recirculation loop to be implemented, thereby considerably complicating manufacture of such devices and increasing the energy cost associated with operating the additional loop.

To remedy those drawbacks, European patent application EP 0 870 534 proposes a macroporous support whose external porosity is modified so as to a porosity gradient to appear along the support. The porosity gradient gives rise to a permeability gradient. Because of the pressure variation, the flow of permeate passing through the membrane becomes constant. Although such a solution makes it possible to modify the support only, that technique suffers from the drawback of reducing the external porosity of the support and thus facilitates the accumulation of molecules or particles which have passed through the separator layer and which statistically can be stopped by the portion of the support having reduced porosity. In practice, the diameter of the pores on a transverse right-section of such a support increases and then diminishes at its periphery, so a risk appears of molecules or particles accumulating. Such accumulation can lead to the support being destroyed. Furthermore, the porosity is reduced solely on the outer ring of the porous support. Thus, internally the porosity of the support is not reduced. Furthermore, while separation is taking place, the pressure inside the channel decreases in the flow direction of the fluid to be treated. After passing through the separator layer, the permeate spreads out in the internal pores and flows towards the outside by seeking out zones requiring least energy. The permeate thus flows mainly via the portion of the support having the greatest porosity. Under such conditions, the porosity gradient implemented in this way leads to a permeate flow arising that is non-uniform along the length of the membrane.

OBJECTS AND SUMMARY OF THE INVENTION

The invention thus seeks to remedy the drawbacks specified above by proposing a cross-flow filter membrane adapted to obtain a permeate flow that is substantially identical along the length of the membrane and that does not present a fragile zone in which the species of the fluid to be treated accumulate because they are retained by the membrane.

To achieve this object, the membrane of the invention comprises an inorganic rigid porous support defining at least one flow channel for the fluid to be treated, the fluid flowing in a given direction, the surface of the channel being covered by at least one separator layer for separating the fluid to be treated. According to the invention, the separator layer has a thickness gradient which decreases in the flow direction of the fluid to be treated.

The invention also provides a method of making a membrane for cross-flow filtering of a fluid to be treated. According to the invention, such a method consists in covering the surface of the channel in at least one separator layer presenting a thickness gradient that decreases in the flow direction of the fluid to be treated.

BRIEF DESCRIPTION OF THE DRAWINGS

Various other characteristics appear from the following description made with reference to the accompanying drawings which show, as non-limiting examples, embodiments and implementations of the invention.

FIGS. 4 and 5 are tables giving experimental measurements respectively for a prior art membrane and for a membrane of the invention.

MORE DETAILED DESCRIPTION

Figure 1:
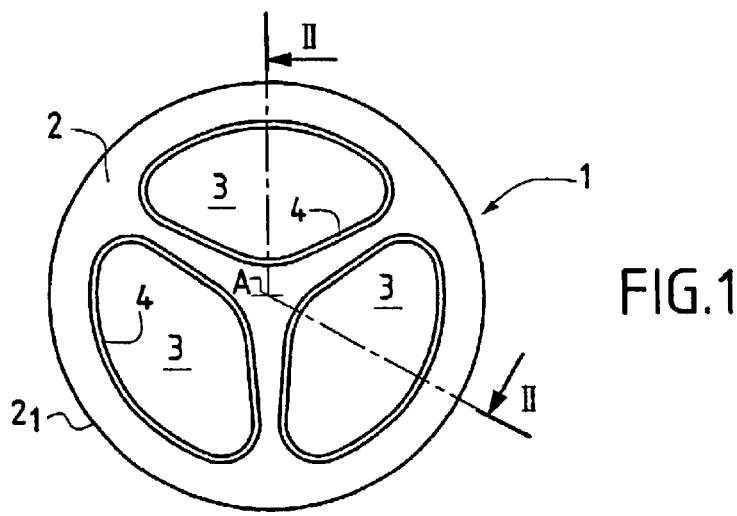
FIG. 1 is a cross-section of an embodiment of a membrane in accordance with the invention.
Figure 2:
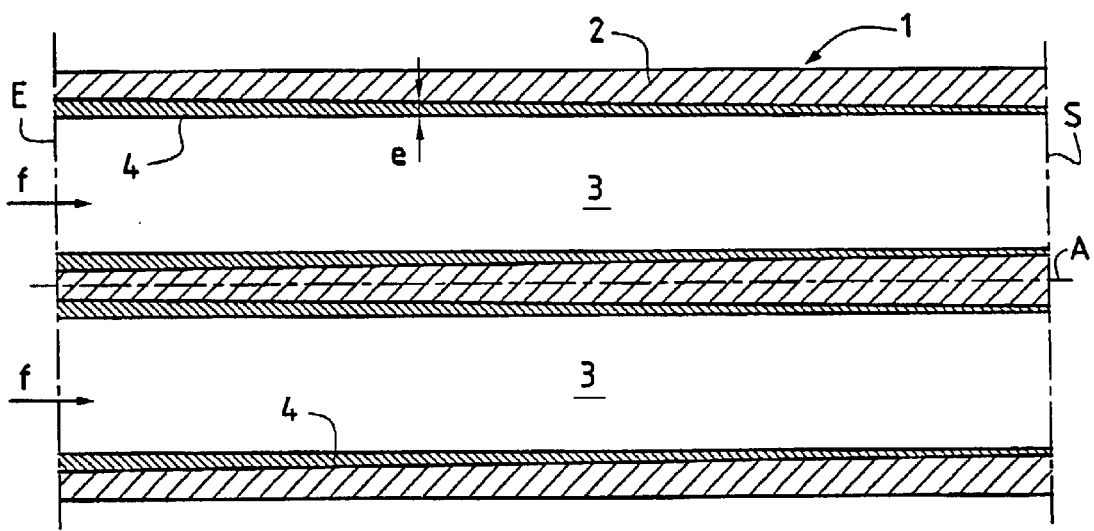
FIG. 2 is a longitudinal section view of a membrane seen substantially on lines II—II of FIG. 1.

As can be seen from FIGS. 1 and 2, the filter membrane 1 of the invention is adapted to separate or filter out molecules or particles contained in various kinds of fluid medium, preferably liquids, and optionally containing a solid phase. In the embodiment shown, the filter membrane 1 is of the tubular type. In this example, the filter membrane 1 has an inorganic rigid porous support 2 made of a material whose transfer resistance is adapted to the separation that is to be performed. The porous support 2 is made of inorganic material, such as a metal oxide, carbon, or metal. In this embodiment, the porous support 2 is elongate in shape, extending along a central longitudinal axis A. The porous support 2 has a polygonal right cross-section or, as shown in FIGS. 1 and 2, a circular cross-section. The porous support 2 thus presents an outside surface $2_1$ that is circularly cylindrical.

The porous support 2 is arranged to have at least one channel, and in the example shown it has three channels 3 extending parallel to the axis A of the support. Each of the channels 3 has a surface covered in at least one separator layer 4 that is to come into contact with the fluid medium to be treated, said medium flowing inside the channels 3 in a flow direction represented by arrows $\underline{f}$ serving to define an inlet E and an outlet S for such a membrane. The nature of the separator layer(s) 4 is/are selected as a function of the separation or filter power that is to be obtained and as a function of ability to form an intimate bond with the porous support 2 so that the pressure from the liquid medium is transmitted to the porous support 2. The layer(s) can be deposited, for example, from suspensions containing at least one metal oxide and conventionally used in the production of inorganic filter elements. The layer(s) is/are subjected to a sintering operation after drying for the purposes of consolidation and bonding with the porous support 2, and between layers when there are two or more layers. A portion of the fluid medium passes through the separator layer 4 and the porous support 2 such that this treated portion of the fluid, referred to as "permeate", flows out through the outside surface $2_1$ of the porous support.

In accordance with the invention, the separator layer 4 is of thickness $\underline{e}$ that presents a gradient which decreases along the flow direction $\underline{f}$ of the fluid to be treated. Thus, the thickest portion of the layer 4 is present at the inlet E of the membrane, while the thinnest portion of the layer 4 is situated at the outlet S of the membrane. Thus, for a separator layer 4 whose permeability is constant regardless of the thickness of the layer 4, the flow of permeate passing through said layer 4 and the porous support 2 is constant along the membrane, providing the thickness $\underline{e}$ of the layer 4 varies in proportion to the pressure. The pressure of the fluid to be treated presents a gradient which decreases in the fluid flow direction $\underline{f}$, i.e. from the inlet E to the outlet S of the membrane. The thickness gradient of the layer is therefore selected in such a manner as to obtain a constant permeate flow rate over the entire length of the membrane.

As can be seen more clearly in the example shown in FIG. 2, the separator layer 4 has a thickness gradient that decreases in substantially continuous manner in the flow direction $\underline{f}$ of the fluid to be treated. It should be observed in the figures that the ratios of dimensions between the separator layer 4 and the porous support 2 are not true, with the scale of the separator layer 4 being exaggerated so as to illustrate the invention.

Figure 3:
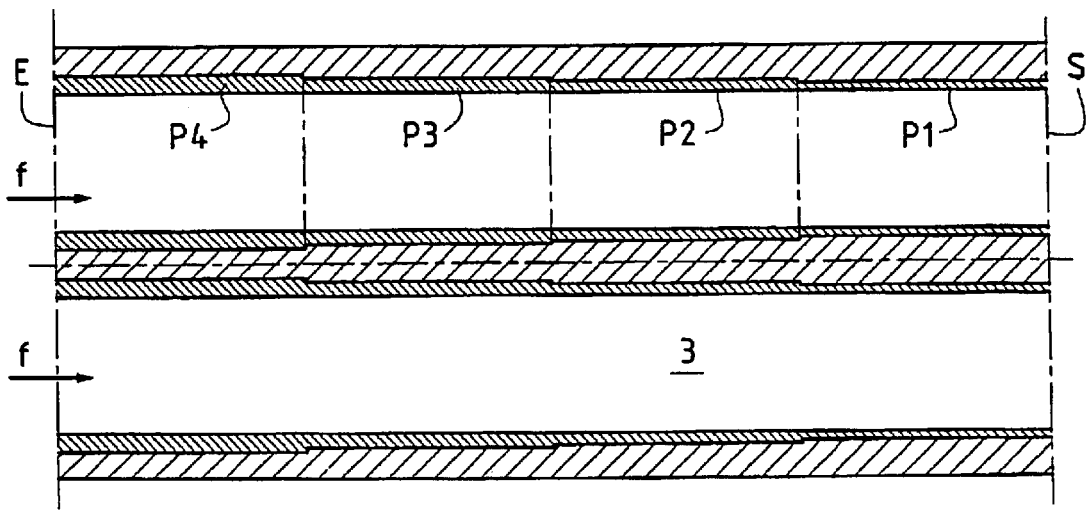
FIG. 3 is a longitudinal section view of another embodiment of a membrane in accordance with the invention.

In another embodiment shown in FIG. 3, the separator layer 4 has a thickness gradient that diminishes in steps $P_1$ in the flow direction $\underline{f}$ of the fluid to the treated. In the embodiment shown, the separator layer 4 has four steps $P_1$ to $P_4$ of thickness that decreases in the flow direction of the fluid to be treated. The steps $P_1$ to $P_4$ of the separator layer 4 are preferably all of substantially identical length in the flow direction. In the example shown, the layer 4 possesses thickness that is substantially constant along each of the steps $P_1$ to $P_4$. Thus, the thickness of the layer in step $P_4$ which is closest to the inlet E is greater than the thickness of the layer in the adjacent step $P_3$, and so on for the other consecutive steps. It should be observed that it can be envisaged for the layer in each step $P_1$ to $P_4$ to be of a thickness that is not constant but that decreases progressively in the flow direction $\underline{f}$, with a discontinuity in layer thickness appearing at the junction zones between consecutive steps.

It should be observed that the above-described examples relate to a membrane made up of channels each of which has a cylindrical shape of right cross-section that is substantially ovoid. Naturally, the invention can be implemented with membranes having one or more channels of a variety of shapes and of various shapes. Similarly, it is clear that the invention can be applied to a membrane having at least one channel 3 of polygonal cross-section arranged in a porous block so as to constitute a membrane of the plane type. In a membrane of this type, the porous support 2 has a series of superposed channels 3 each presenting a right cross-section that is rectangular and having its walls covered in a separator layer.

The invention also provides a method of making a filter membrane 1 of the kind described above. The description below relates to a method for making a membrane of the kind shown in FIG. 3. Such a method consists in subdividing each channel 3 into a series of segments $P_1$ of substantially equal length, e.g. four segments $P_1$ to $P_4$ in the example shown. The surface of each channel 3 is then covered in a separator layer 4 by implementing as many deposition operations as there are segments $P_1$. In the example shown, the layer 4 is obtained by four successive deposition operations using a suspension that includes various components that are generally in the form of grains. In conventional and well known manner, the thickness of the deposit is controlled by parameters relating to suspension concentration and to time of contact between the suspension and the porous support 2. In the method of the invention, the deposits are made on the surfaces of the channels 3 starting from the inlet end E, with the length of channel subjected to deposition being reduced by one segment for each successive deposition operation. Thus, in the example shown of a separator layer 4 having four segments $P_1$ to $P_4$, a suspension is initially deposited on all four segments $P_1$ to $P_4$ of the membrane. Thereafter, a second deposition operation is performed on segments $P_4$ to $P_2$, a third operation on segments $P_4$ and $P_3$, and a fourth operation on segment $P_4$. A separator layer 4 is thus obtained which presents a thickness gradient that decreases in steps from one end E to the other end S of the membrane.

It should be observed that a membrane of the invention can be manufactured by another technique which consists in placing the porous support 2 vertically and in filling the channels 3 with a suspension for depositing the separator layer 4 that is to be obtained. Given the vertical disposition of the porous support 2, the pressure in the bottom portion of the support is different from that in the top portion by an amount that is proportional to the height of the porous support 2. The deposit made in this way thus takes up a "billiard cue" appearance, such that the thickness of the separator layer 4 increases starting from the top of the porous support. It is recalled that the thickness of the deposited separator layer 4 depends on contact time between the porous support 2 and the suspension. Thus, provision can be made to empty the channels 3 progressively, so as to obtain progressively increasing time of presence for the deposition suspension inside a channel. This makes it possible to obtain a separator layer 4 having a gradient thickness that increases from the top end to the bottom end of the support. Such a membrane has a separator layer 4 whose thickness gradient decreases in the flow direction of the fluid when the inlet E is considered as being the bottom portion of the support and the outlet S the top portion of the support.

Naturally, a filter membrane having a separator layer with a thickness gradient can be manufactured by deposition methods other than those described above. In addition, it should be understood that the separator layers are deposited using techniques that are conventional and well known in the field, such that no further description is given on this subject.

The filter membrane 1 of the invention makes it possible, without any risk of making the membrane fragile, to obtain in relatively simple manner a permeate flow rate that is constant along the membrane by determining a thickness gradient for the separator layer that decreases in the flow direction of the fluid to be treated. This characteristic can be seen clearly by comparing the tables of FIGS. 4 and 5.

In the experiment described below, a porous support 2 was used having a single channel with an outside diameter of 10 mm, an inside diameter of 6 mm, and a length of 1200 mm. The porous support had a mean equivalent pore diameter of 5 $\mu$m. A titanium oxide suspension was deposited on the walls of the channel such that after sintering a deposit was obtained having a mean equivalent diameter of 1.5 $\mu$m. To analyze the uniformity of the deposit, the membrane 1 made in the above manner was cut up into four segments $P_1$ to $P_4$ of equal length and each segment was measured for permeability to water.

The table of FIG. 4 is based on using water as the fluid and membrane segments in accordance with the prior art, and it shows:

the thickness of the separator layer having a mean equivalent pore diameter of 1.5 $\mu$m; and the permeability of the separator layer.

On examining the table, it can be seen that the layer thickness values and thus the permeability values are relatively uniform for the various segments of the membrane.

The table of FIG. 5 gives the characteristics of thickness and permeability for the separator layer of a membrane having a channel coated in a layer 4 of the kind described with reference to FIG. 3. Such a membrane of the invention thus has a layer 4 made by implementing four successive deposition operations so as to provide four segments corresponding to the steps $P_1$ to $P_4$.

Comparing the segments $P_1$ to $P_4$ shows that the thickness of the separator layer 4 decreases in the flow direction of the fluid, i.e. going from step $P_4$ towards step $P_1$. In addition, it should be observed that the permeability of the separator layer 4 is substantially constant.

The table of FIG. 5 also shows for each segment and for three different flow speeds corresponding to three different head loss values: mean pressure; permeate flow rate; and the ratio between the flow rate of the inlet segment and the flow rate of the outlet segment for a membrane of the invention, as shown in FIG. 3. It can be seen that the object of the invention is achieved insofar as a substantially constant permeate flow rate can be obtained independently of any mechanical system and regardless of which surface element inside the membrane is under consideration. The ratio of inlet segment flow rate/outlet segment flow rate is very close to 1 and is smaller in value than the flow rate ratio obtained on a conventional membrane, where the results are given in the table of FIG. 4.

Examining the ratio of the flow rate in the inlet segment $P_4$ over the flow rate in the outlet segment $P_1$ for a membrane of the invention (FIG. 5) shows that the flow rate is slightly greater in the outlet segment than in the inlet segment (ratio less than 1). These results show the effectiveness of providing a separator layer having a thickness gradient that decreases in the flow direction of the fluid, insofar as the permeate flow rate is substantially identical all along the membrane. The value of less than 1 for the ratio of flow rate in the inlet segment over flow rate in the outlet segment can be explained by the separator layer 4 having thickness that is slightly too great compared with the pressure exerted by the fluid. The value selected for the thickness gradient of the separator layer 4 is selected in such a manner that considering the operating parameters of the membrane it is possible to obtain a permeate flow rate that is constant or substantially constant all along the membrane. In other words, the thickness gradient of the separator layer 4 is selected as a function of the pressure gradient of the fluid flowing along the channel, so as to obtain a permeate flow rate that is constant all along the membrane. It should be observed that the permeate flow rate is considered as being constant all along the membrane providing the difference between maximum permeate flow rate presented by a section of membrane and minimum permeate flow rate presented by some other section of membrane differ by no more than 20%. Thus, the ratio of the permeate flow rate in the section presenting the highest value over the permeate flow rate in the section presenting the lowest value lies in the range 1 to 1.2.

It can be seen in FIG. 5 that the speed V of the fluid to be treated causes the ratio of permeate flow rate to vary between the inlet segment and the outlet segment. Thus, the thickness gradient should be determined for a given flow speed of the fluid. In the example shown, the thickness of the separator layer 4 is particularly well adapted to a fluid flow speed of 5 meters per second (m/s). However, it should be observed that such a membrane continues to be effective even for different values of the flow speed of the fluid to be treated.

In FIG. 5, by comparing the permeability of the separator layer 4 and the flow rate of the segment, it can also be seen that the permeability of the porous support 2 is greater than that of the separator layer 4. In conventional manner, the porous support 2 needs firstly to provide mechanical strength against the transfer pressure, and secondly to be sufficiently permeable to avoid constituting a brake on filtering.

What is claimed is:

1. A method of making a membrane for cross-flow filtering of a fluid to be treated, comprising:

providing an inorganic support having a first end and an opposite second end, and defining at least one flow channel being open therethrough and open at said first end and defining an inlet for the fluid to be treated, and open at the opposite end and defining an outlet for the fluid to be treated, the fluid being treated thereby flowing therethrough in a given direction from the open inlet end to the open outlet end, and covering the surface of the channel with at least one separator layer for separating the fluid to be treated, the layer presenting a thickness gradient that decreases from the oven inlet end to the opposite open outlet end in the flow direction of the fluid to be treated.

2. A method according to claim 1, consisting in covering the surface of the channel in a separator layer that presents a thickness gradient which decreases in substantially continuous manner in the flow direction of the fluid to be treated.

3. A method according to claim 2, consisting in selecting the thickness gradient of the separator layer as a function of the pressure gradient of the fluid to be treated when flowing in the channel so as to obtain a permeate flow rate that is constant all along the membrane.

4. A method according to claim 3, consisting in depositing the separator layer on the porous support:

by placing the porous support vertically;

by filling each channel with a suspension for depositing the separator layer; and by emptying each channel progressively so as to cause the deposition suspension to remain inside the channel for a length of time that increases progressively, thereby obtaining a separator layer having a thickness gradient which decreases in the flow direction of the fluid, which is considered as extending from the bottom end towards the top end of the porous support.

5. A method according to claim 2, consisting in covering the surface of the channel in a separator layer presenting a thickness gradient that decreases in steps in the flow direction of the fluid to be treated.

6. A method according to claim 5, consisting in covering the surface of the channel in a separator layer presenting a thickness gradient that decreases in steps all of which present substantial identical length in the flow direction.

7. A method according to claim 6, consisting:

in subdividing the length of each channel into a series of segments of substantially equal length; an in covering the surface of each channel in a separator layer by performing as many deposition operations as there are segments, starting from an inlet end of the channel and decreasing the length of channel treated by one segment for each succession deposition operation.

* * * * *